United States Patent Office 2,874,180
Patented Feb. 17, 1959

2,874,180
PRODUCTION OF PROCAINE DIHYDROGEN PHOSPHATE

Allen G. Debus, Waukegan, Ill., assignor to Abbott Laboratories, North Chicago, Ill., a corporation of Illinois No Drawing. Application November 16, 1954
Serial No. 469,313

1 Claim. (Cl. 260—472)

This invention relates to a new and useful salt of procaine, namely procaine dihydrogen phosphate. The invention also relates to a method of making said salt.

It is well recognized in the art that aqueous solutions of procaine, or more particularly aqueous solutions of procaine salts, may be expected to undergo decomposition upon ageing unless careful steps are taken to stabilize these solutions. Procaine hydrochloride is the most widely used salt but the inadequacies of it are well known and reported in the art. Procaine hydrochloride is so unstable that it has been dispensed in dry ampoules with instructions to add water just prior to use.

It is a principal object of this invention to provide a salt of procaine which will have a natural pH definitely on the acidic side and which will be both active and stable.

According to the practice of this invention, and in the accomplishment of the foregoing object, there is now provided a novel and useful salt of procaine, namely procaine dihydrogen phosphate. It is well recognized that the chemistry of phosphoric acid and salts thereof is very complex, and that salts of phosphoric acid may take several different forms. This invention pertains particularly to that salt formed by the interaction of orthophosphoric acid and procaine base with the formation of a white crystalline solid which has a pH of about 4.5 when dissolved in water.

The following examples are presented in order to disclose the invention in full detail but it should be understood that the invention is not intended to be limited in any way by the examples.

Example I 354 g. (1.5 mole) of procaine base ($\beta$-diethylaminoethyl p-aminobenzoate) is dissolved in about 4.5 liters of 95% ethanol with stirring. The solution is carbon treated and filtered. To the filtrate is added 85% orthophosphoric acid in sufficient amount to reduce the pH of the solution to about 3.6. A precipitate begins to form when sufficient orthophosphoric acid has been added to achieve about neutral conditions (an excess of orthophosphoric acid over the calculated equivalent amount) and additional material is precipitated as more acid is added. In this instance about 1380 g. (85%) of acid is used in reaching pH 3.6. The precipitate is collected and dried in a forced air oven and a yield of about 359 g. (71.8%) is obtained. The product may be recrystallized from 80% ethanol if greater purity is desired. The recrystallized product has a melting point of about 192° C. and assays 9.19% phosphorous and 8.38% nitrogen as compared to a theoretical 9.28% phosphorous and 8.38% nitrogen calculated from the formula $C_{13}H_{23}O_6N_2P_1$. An aqueous solution of the product has a pH of about 4.5 and the product is soluble in water at room temperature in the amount of about 0.19 to 0.20 g./ml. According to its chemical assay and according to calculations involving the pK values of phosphoric acid and procaine the material is identified as procaine dihydrogen phosphate.

Example II

A portion of the salt identified in the preceding example as procaine dihydrogen phosphate is dissolved in water and has a pH of 4.5 in solution. The salt exhibits improved stability in solution over procaine hydrochloride.

Example III

To an aqueous solution prepared in accordance with the instructions given in Example II is added a small amount of disodium hydrogen phosphate and sufficient phosphoric acid to reduce the pH of the solution to about 3.6. This solution exhibits prolonged stability in the presence of agents such as polyethylene, which normally accelerate the destruction of procaine hydrochloride.

Others may practice this invention in any of the numerous ways which will be suggested to one skilled in the art. All such practice of the invention is intended to be included hereunder provided it falls within the scope of the appended claim.

I claim:

The method of making crystalline procaine dihydrogen phosphate characterized by a pH of about 4.5 in aqueous solution which comprises, adding a large excess of orthophosphoric acid to a solution of procaine base in an amount to reach a pH of about 3.6, and recovering the precipitated procaine dihydrogen phosphate from said solution.

References Cited in the file of this patent

UNITED STATES PATENTS 2,382,546     Curtis _____ Aug. 14, 1945

OTHER REFERENCES

Greenbaum et al., Chem. Abst. 39, 156 (1945).